United States Patent [19]

Fuhr et al.

[11] Patent Number: 5,021,488

[45] Date of Patent: Jun. 4, 1991

[54] FLAMEPROOFED, NON-DRIPPING POLYAMIDE MOULDING COMPOSITIONS

[75] Inventors: Karl Fuhr, Krefeld; Friedemann Müller, Neuss; Karl-Heinz Ott, Leverkusen; Aziz El-Sayed, Leverkusen; Peter-Rolf Müller, Leverkusen; Martin Wandel, Dormagen, all of Fed. Rep. of Germany

[73] Assignee: Bayer Aktiengesellschaft, Leverkusen, Fed. Rep. of Germany

[21] Appl. No.: 556,345

[22] Filed: Jul. 23, 1990

[30] Foreign Application Priority Data

Aug. 4, 1989 [DE] Fed. Rep. of Germany ....... 3925792

[51] Int. Cl.$^5$ ............................................. C08K 5/5313
[52] U.S. Cl. .................................... 524/116; 524/126; 524/405
[58] Field of Search ....................... 524/116, 126, 405; 558/76, 162

[56] References Cited

U.S. PATENT DOCUMENTS

| | | | |
|---|---|---|---|
| 3,666,717 | 5/1972 | Davy et al. | 524/116 |
| 3,900,444 | 8/1975 | Racky et al. | 524/126 |
| 4,036,811 | 7/1977 | Noetzel et al. | 524/126 |
| 4,111,900 | 9/1978 | Noetzel et al. | 558/162 |
| 4,208,221 | 6/1980 | Sandler | 524/126 |

FOREIGN PATENT DOCUMENTS

| | | |
|---|---|---|
| 0095100 | 11/1983 | European Pat. Off. . |
| 0122699 | 10/1984 | European Pat. Off. . |
| 0139893 | 5/1985 | European Pat. Off. . |
| 0332965 | 3/1989 | European Pat. Off. . |
| 3219047 | 11/1983 | Fed. Rep. of Germany . |

*Primary Examiner*—Veronica P. Hoke
*Attorney, Agent, or Firm*—Connolly and Hutz

[57] ABSTRACT

The invention relates to flameproofed, non-dripping polyamide moulding compositions which contain certain amounts of A) phosphinic acid esters of polyphenols based on phenol-aldehyde/ketone condensates,
B) antidripping agents (such as polyfluoroethylene polymers or aramides) and
C) zinc borate and if appropriate reinforcing agents and other additives for flameproofing and for processing etc.

10 Claims, No Drawings

FLAMEPROOFED, NON-DRIPPING POLYAMIDE MOULDING COMPOSITIONS

The invention relates to flameproofed, non-dripping polyamide moulding compositions which contain certain amounts of
(A) phosphinic acid esters of polyphenols based on phenol-aldehyde/ketone condensates,
(B) antidripping agents (such as polyfluoroethylene polymers or aramides) and
(C) zinc borate
and if appropriate reinforcing agents and other additives for flameproofing and for processing etc.

Ester of phosphinic acids and alcohols or phenols are known. They have also already been proposed as flameproofing agents. DE-OS No. 3 219 047 claims phosphinic acid esters of dihydric alcohols or mono- or polyhydric phenols as flameproofing agents for moulding compositions of polyphenylene oxide and impact-modified polymer of a monovinyl aromatic compound. Resorcinol, pyrocatechol and phloroglucinol are mentioned specifically as polyhydric phenols. Phosphinic acid esters of phenol-aldehyde/ketone condensates are not mentioned. The use of phosphinic acid esters of the type claimed as flameproofing agents for polyamide in conjuction with antidripping agents (such as polyfluoroethylene polymers or aramide) and zinc borate also has not previously been described.

The invention relates to flameproofed, non-dripping polyamide moulding compositions which contain, in 100 parts by wt. of these polyamide moulding compositions, the following additives:
(A) 3 to 20 wt. %, preferably 5 to 15 wt. %, phosphinic acid esters of polyphenols, of the formula (I)

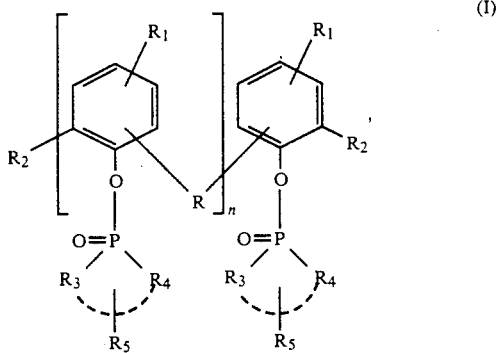

wherein
n is an integer between 1 and 20, preferably between 1 and 10,
R is an alkylene group having 1 to 4 carbon atoms, a cycloalkylene group having 5 to 9 carbon atoms or, if n=1, also a direct bond, a sulphonyl group or carbonyl or oxygen or sulphur,
$R_1$ and $R_2$ are hydrogen, halogen, alkyl groups having 1 to 12 carbon atoms, cycloalkyl groups having 5 to 9 carbon atoms or aryl groups having 6 to 10 carbon atoms and
$R_3$ and $R_4$ are alkyl groups having 1 to 4 carbon atoms and/or aryl groups having 6 to 10 carbon atoms, it also being possible for $R_3$ and $R_4$, in the case of alkyl groups, to be bonded by a single or double bond and for the ring formed via the phosphorus atom to carry alkyl groups $R_5$ having 1 to 4 carbon atoms, and R is bound preferably to the ortho or para-position of the phenol-nucleus, where then $R_1$ is bound to the para or ortho-position respectively.

(B) antidripping agents in a total amount of not more than 6 wt. %, preferably not more than 3 wt. %, from the series comprising
(B1) 0.1 to 3 wt. %, preferably 0.3 to 1.0 wt. %, of a polyfluoroethylene polymer and/or ethylene polymer and/or
(B2) 0.1 to 5 wt. %, preferably 1 to 2.5 wt. %, of an aramide,
(C) 0.5 to 15 wt. %, preferably 3 to 12 wt. %, zinc borate (hydrates) as a flameproofing reinforcing agent
and if appropriate other additives from the series comprising
(D) 0 to 40 wt. %, preferably 15 to 30 wt. %, inorganic fillers and/or reinforcing agents and/or pigments,
(E) 0 to 30 wt. %, preferably 5 to 20 wt. %, other flameproofing agents, such as nitrogen compounds, halogen compounds and/or other phosphorus compounds,
(F) 0 to 10 wt. %, preferably 1 to 5 wt. %, processing auxiliaries and
(G) 0 to 20 wt. % customary additives for polyamides, such as UV, light and heat stabilizers, known agents for improving impact strength and agents for improving compatibility.

The amounts added to the polyamide mixture should not exceed 60 wt. %, preferably 53 wt. %, in particular 47 wt. %, in total here in the preferred embodiment; the part amounts should also be limited here:

the total amounts of flameproofing additives (A+B+C+E) should not exceed 35 wt. %, preferably 30 wt. %, in particular 25.5 wt. %;

the total amounts of additives (F+G) should not exceed 25 wt. %;

and the total amounts of (D) should not exceed 40 wt. % of the polyamide mixture.

The phosphinic acid esters (I) employed according to the invention are alkyl- and arylphophinic acid esters of bisphenols and polyphenols, such as are represented by condensation products of phenols with aldehydes or ketones. Preferred compounds here are alkyl- and arylphosphinic acid esters of bisphenols and higher molecular weight phenol-formaldehyde condensation products (generally called novolaks) of the formula (II) and (III), formula (II) representing the phosphinic acids esters of bisphenols and formula (III) representing those of novolaks (n≥2, preferably 3-8)

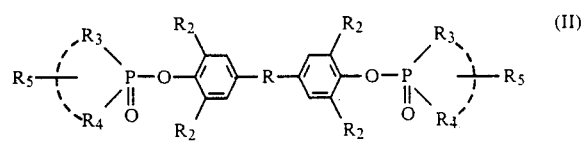

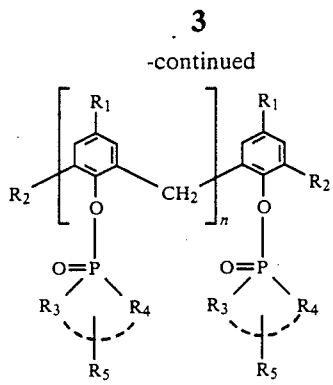

and wherein n represents an integer between 2 and 15, preferably between 2 and 10, R represents a single bond, a methylene or isopropylidene group, oxygen, sulphur or a sulphonyl or carbonyl group, $R_1$ represents hydrogen, halogen or an alkyl group having 1 to 12 carbon atoms, $R_2$ represents hydrogen, halogen or an alkyl group having 1 to 4 carbon atoms and $R_3$ and $R_4$ represent methyl, ethyl or phenyl groups or together represent the butylidene or alkylbutylidene group.

Especially preferred compounds are those of the formula (IV) and (V)

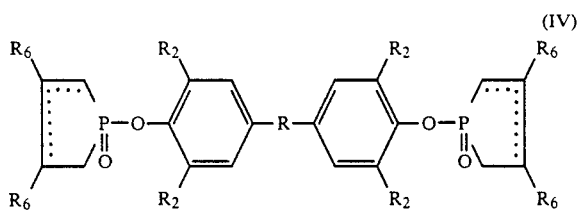

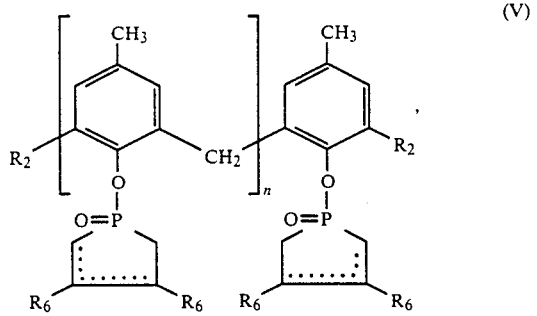

wherein n represents an integer between 2 and 8,

R has the meaning described above, $R_2$ represents hydrogen or methyl groups and $R_6$ likewise represents hydrogen or methyl groups.

Polyamides in the sense of the invention are all the amorphous and/or partly crystalline, predominantly aliphatic/cycloaliphatic, thermoplastic polyamides which are prepared by the known polycondensation and/or polymerization process from predominantly aliphatic/cycloaliphatic diamines and dicarboxylic acids and/or lactams having from 4 methylene groups in the lactam ring. Starting materials are aliphatic or mixed aliphatic aromatic dicarboxylic acids having less than 50 wt. % aromatic constituents, such as adipic acid, 2,2,4- and 2,4,4-trimethyladipic acid, azelaic acid, sebacic acid, decanedicarboxylic acid, dodecanedicarboxylic acid, cyclohexanedicarboxylic acid, hexahydroterephthalic acid, isophthalic acid and terephthalic acid, and aliphatic and aromatic diamines, such as hexamethylenediamine, 2,2,4- and 2,4,4-trimethylhexamethylenediamine, diamino-dicyclohexylmethane isomers, diamino-dicyclohexylpropane isomers and isophoronediamine (isomers), xylylenediamines and aminocarboxylic acids, such as ε-aminocaproic acid and ω-aminocarboxylic acids, such as ω-aminoundecanoic acid or ω-aminolauric acid.

Copolyamides of several of the monomers mentioned can also be employed.

Polyamide-6, polyamide-6,6, polyamide-6,10, polyamide-6,12, polyamide-11, polyamide-12, polyamide-6T6 or-6I6 having aromatic contents of less than 50 wt. % are preferred. They preferably have a relative viscosity (measured on a 1 wt. % solution in m-cresol at 25° C.), of 2.0 to 5.0, preferably of 2.5 to 4.0.

The polyamides can be prepared by known processes (see Kunststoff-Handbuch (Plastics Handbook), Volume VI, pages 11 to 198, Carl-Hanser-Verlag, Munich, 1966).

(A) Phosphinic acid esters

The phosphinic acid esters employed according to the invention are the dialkyl-, diaryl- and alkylarylphosphinic acid esters of bis- and polyphenols (novolaks). Since the phosphinic acids cannot be converted directly into the esters according to the invention, their more reactive derivatives are to be used. These are the acid chlorides, which are reacted with the polyphenols to give the esters according to the invention by splitting off hydrogen chloride, and phenyl esters (likewise from the acid chlorides), which are reacted with the polyphenols to give the esters according to the invention by splitting off phenol (transesterification).

Examples of phosphinic acids are dimethylphosphinic acid, methylethylphosphinic acid, diethylphosphinic acid, methylphenylphosphinic acid, ethylphenylphosphinic acid, diphenylphosphinic acid, di-p-tolylphosphinic acid and phenylnaphthylphosphinic acid, as well as 1-hydroxy-1-oxo-phospholine, 1-hydroxy-1-oxo-3-methyl-phospholine and 1-hydroxy-1-oxo-3,4-dimethyl-phospholine.

Preparation processes for phosphinic acids and their derivatives, such as chlorides and phenyl esters, are known and summarized in the literature (Methoden der organischen Chemie (Methods of Organic Chemistry) (Houben-Weyl), Volume XII/1, pages 217 to 266, and Volume E2, pages 123 to 221).

The reaction of the phosphinic acid chlorides with bis- and polyphenols is carried out quite slowly at temperatures of 180° to 200° C., hydrogen chloride being split off. If catalysts, such as magnesium chloride, are also used, this already takes place at lower temperatures and in shorter times. At lower temperatures, inert high-boiling solvents must also be used in the esterification of novolaks, for viscosity reasons. Magnesium chloride or tertiary amines are usually employed as catalysts. In the case of the transesterification process, which proceeds considerably more rapidly, magnesium chloride is likewise used as a catalyst. The temperatures are again 200° C.

Bisphenols and novolaks are prepared by known processes (see for bisphenols: H. Schnell and H. Krimm, Angew. Chemie 75 (1963), 662 to 668; for novolaks: Methoden der organischen Chemie (Methods of Organic Chemistry) (Houben-Weyl), Volume XIV/2, pages 193 to 292, and Ullmanns Encyclopädie der Technischen Chemie (Ullmann's Encyclopaedia of Industrial Chemistry) 4th Edition, Volume 18, pages 245 to 257).

Suitable bisphenols which may be mentioned are:
bis-(hydroxyphenyl)-alkanes,
bis-(hydroxyphenyl)-cycloalkanes,
bis-(hydroxyphenyl) ethers,
bis-(hydroxyphenyl) ketones, bis-(hydroxyphenyl) sulphones and nuclear-alkylated and nuclear-halogenated derivatives thereof.

The most important bisphenols in the sense of the invention are: 4,4'-dihydroxydiphenyl, 2,2-bis-(4-hydroxyphenyl)-propane, bis-(4-hydroxyphenyl)-methane, 4,4'-dihydroxybenzophenone, 4,4'-dihydroxydiphenyl ether, 4,4'-dihydroxydiphenyl sulphide, 4,4'-dihydroxydiphenyl sulphone and nuclear-substituted derivatives thereof, preferred possible substituents being $CH_3$, Cl or Br. A nuclear-methylated derivative is 2,2-bis-(4-hydroxy-3,5-dimethylphenyl)-propane.

Particularly preferred diphenols are 2,2-bis-(4-hydroxyphenyl)propane, 4,4'-dihydroxydiphenyl, 4,4'-dihydroxydiphenyl ether, 4,4'-dihydroxydiphenyl sulphone, 4,4'-dihydroxybenzophenone and 2,2-bis-(4-hydroxy-3,5-dimethylphenyl)-propane.

It is also possible to employ mixtures of diphenols.

Suitable novolaks are condensation products of formaldehyde and phenols of the general formula (VII)

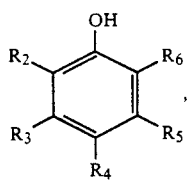

(VII)

wherein
$R_2$ and $R_6$ designate hydrogen atoms and $R_3$, $R_4$ and $R_5$ can optionally be hydrogen, halogen or $C_1$-$C_{20}$-alkyl, cycloalkyl or $C_6$-$C_{10}$-aryl groups, or wherein $R_2$ and $R_4$ designate hydrogen atoms and $R_3$, $R_5$ and $R_6$ can be the abovementioned radicals.

Characteristic examples of phenols are, without in this way making a limitation, phenol, o-cresol, m-cresol, p-cresol, 2,5-dimethyl-, 3,5-dimethyl-, 2,3,5-trimethyl-, 3,4,5-trimethyl-, p-t-butyl-, p-n-octyl-, p-steary-, p-phenyl-, p-(2-phenylethyl)-, 1-phenylethyl-, o-isopropyl-, p-isopropyl- and m-isopropylphenol and numerous other phenols.

Phenol, o-cresol, m-cresol, p-cresol, p-t-butylphenol and o-t-butylphenol and p-octylphenol are preferably employed.

However, it is also possible to employ mixtures of these phenols.

Novolaks which are preferably employed are accordingly, without in this way making a limitation:
phenol/formaldehyde novolak,
o-cresol/formaldehyde novolak,
m-cresol/formaldehyde novolak,
p-cresol/formaldehyde novolak,
t-butylphenol/formaldehyde novolak and
p-octylphenol/formaldehyde novolak.
p-Cresol/formaldehyde novolak is particularly preferred.

(B) Antidripping agents

The polyfluoroethylene polymers (B1) which are suitable according to the invention are polymers having fluorine contents of 65 to 76 wt. %, preferably 70 to 76 wt. %. Examples are polytetrafluoroethylene, tetrafluoroethylene-hexafluoropropylene copolymers, tetrafluoroethylene-difluoroethylene copolymers or tetrafluoroethylene copolymers with small amounts of fluorine-free copolymerizable ethylenically unsaturated monomers. The polymers are known. They can be used in finely divided form, usually as powders. They can be prepared by known processes, thus, for example, by polymerization of tetrafluoroethylene in an aqueous medium using a catalyst which forms free radicals, for example the peroxydisulphate of sodium, potassium or ammonium, under pressures of 7 to 71 kg/cm$^2$ and at temperatures of 0° to 200° C., preferably at temperatures of 20° to 100° C. (for further details see, for example, U.S. Pat. No. 2,393,967).

The polyfluoroethylene polymers which are suitable according to the invention should preferably have a weight-average molecular weight $\overline{M}_w$ of between $10^5$ and $10^6$.

The polyfluoroethylene polymers are preferably added in non-sintered form.

The dripping of the moulding composition melt during the burning operation is reduced or prevented completely, in particular, by the addition of polyfluoroethylene polymers.

Aromatic polyamides (B2) which are suitable as antidripping agents are usually prepared from aromatic arylenedicarboxylic acids and aromatic diamines by solution condensation or by interface condensation (Kirk-Othmer, Encyclopaedia of Chemical Technology, Third Edition, Volume 3, pages 213 to 242).

Arylenedicarboxylic acids are, in particular, phthalic acid, isophthalic acid and terephthalic acid.

Examples of aromatic diamines are: o-phenylenediamine, m-phenylenediamine, p-phenylenediamine and diaminodiphenyl, in which the phenyl units are linked via a direct bond or hetero atom or groups, corresponding to the formula

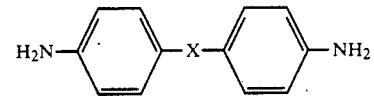

X=direct bond, —O—, —S—, —SO$_2$—, —CO—, —CH$_2$—, —C(CH$_3$)$_2$— or —CF$_2$—.

Further suitable antidripping agents are polyimideamides, such as:

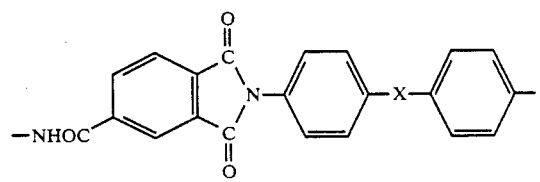

X= —CH$_2$— or —O—.

Aramides which contain heterocyclic structures in the main chain, such as oxidazole, triazole, bithiazole, benzimidazole, hydantoin and quinazolone structures (see Ullmanns Encyklopädie der Technischen Chemie (Ullmann's Encylcopaedia of Industrial Chemistry), 4th Edition, Volume 11, pages 345 to 350) and if appropriate have been built up via dicarboxylic acids, diamines or aminocarboxylic acids, are furthermore suitable.

Those aromatic polyamides which consist to the extent of more than 50 percent by weight in total of the abovementioned aromatic polyamides, the remainder being (cyclo)aliphatic carboxylic acids and/or (cyclo)aliphatic diamines, are also suitable. Examples of aliphatic dicarboxylic acids which can be employed are:

adipic acid, 2,2,4- and 2,4,4-trimethyladipic acid, azelaic acid, sebacic acid, decanedicarboxylic acid and dodecanedicarboxylic acid.

Examples of aliphatic diamines which can be employed are:

hexamethylenediamine, 2,2,4- and 2,4,4-trimethylhexamethylenediamine, diamino-dicyclohexylmethane isomers, diamino-dicyclohexylpropane isomers, isophoronediamines and the xylylenediamines.

(C) Zinc borates hydrates

Zinc borates (hydrates) can be products of varying composition (see Ullmann's Encyclopaedia of Industrial Chemistry, 5th Edition, Volume A4, page 276). $2ZnO*3B_2O_3*3.5H_2O$ is particularly suitable as a flameproofing agent for polyamide moulding compositions because of its stability up to within temperature ranges of 290°–300° C.

(D) Reinforcing agents

Inorganic reinforcing agents which can optionally be employed according to the invention include all the agents known for reinforcing polyamides. Examples which may be mentioned are: glass fibres, glass beads and/or mineral fillers, as described in Katz and Milewski, "Handbook of Fillers and Reinforcements for Plastics", Nostrand-Verlag, 1978. Glass fibres are preferably employed as the inorganic reinforcing agents. The glass fibres employed in general have a diameter of about 6 to 15 μm, preferably 8 to 13 μm, and a length to thickness ratio of more than 45, preferably 50 to 200.

Other possible fillers and reinforcing substances are microbeads of glass, carbon fibres, chalk, quartz, such as, for example, novaculite, and silicates, such as asbestos, feldspar, mica, talc, wollastonite and kaolin in calcined and non-calcined form, and also, as other fillers and pigments, alkaline earth metal carbonates, alkaline earth metal oxides, titanium dioxide and/or zinc sulphide. The mineral fillers employed have average particle diameters of less than 20 μm, preferably less than 10 μm, in particular 2 to 8 μm. They can be surface-modified in a suitable manner, e.g. treatment with aminoalkylsilane.

(E) Other flameproofing agents

Organic halogen compounds which are suitable for the flameproofing agent combinations are generally known, for example halogenated Diels-Alder adducts, e.g. hexachlorocyclopentadiene, hexachloroendomethylenetetrahydrophthalic acid and the anhydride thereof, bis-(hexachlorocyclopentadiene)-cyclooctane (Dechlorane Plus from Occidental Chemical Corp., USA) and tetrachlorophthalic acid anhydride. Examples of other possible bromine-containing flameproofing agents are: hexabromobenzene, pentabromotoluene, octa- and decabromodiphenyl, octa- and decabromodiphenyl ether, hexabromo-bis-phenoxyethane, ethylene-bis-tetrabromophthalimide and mixtures thereof, as well as brominated polystyrenes (Pyro-Check types from Ferro Corp., USA) and brominated polyphenylene oxide (Great Lakes PO 64 P from Great Lakes Chem. Corp., USA).

Organic phosphorus compounds, such as phosphates and phosphonates, are particularly suitable for the flameproofing agent combinations. Aromatic phosphates, e.g. triphenyl phosphate and dicresyl phenyl phosphate, and also phosphonates, such as diphenyl methyl phosphonate and dicresyl phenyl phosphonate, as well as phosphoric acid esters and phosphonic acid esters of novolaks, are preferred. Red phosphorus (preferably stabilized in the customary manner), in pure or in capsulated form, can also be used as a flameproofing agent in the combination.

Examples of organic nitrogen compounds which are suitable for the flameproofing agent combinations are melamine, cyanuric acid and salts of these components, such as melamine cyanurate, borate and/or phosphate.

Other flameproofing agents which can be added are metal oxides, e.g. antimony(III) oxide, lead(IV) oxide, cerium(IV) oxide, copper(II) oxide, molybdenum(VI) oxide, vanadium(V) oxide, bismuth(III) oxide, tungsten(VI) oxide, tin(IV) oxide and zirconium(IV) oxide and mixtures thereof.

(F) Processing auxiliaries

Processing auxiliaries (F) which can be added to the moulding compositions according to the invention are mould release agents, stabilizers, flow auxiliaries and plasticizers.

Mould release agents which can be used are ester waxes, e.g. montan wax, amide wax, such as Rhenax ®, and/or oligoethylenes. Possible plasticizers are e.g. aliphatic oligomeric polyesters (see EP No. 29 931

(G) Impact modifiers

Suitable impact modifiers are, in particular, rubbers, such as butadiene-acrylonitrile copolymers, butadiene-styrene copolymers, butadiene-isoprene or butadiene-styrene block copolymers, alkyl acrylate rubbers, EP and EPDM rubber systems and silicone rubbers. Graft rubbers in which vinyl monomers or copolymers are grafted onto one of the abovementioned rubbers systems and in which the glass transition temperature of the graft base should be below $-10°$ C. are preferably employed as the rubber component. They preferably also contain adhesive groups for the polyamide, e.g. carboxyl groups or anhydride groups. Graft rubbers of the MBS or MABS or EP, EB or EPDM or EBDM rubber type (E=ethylene, B=butylene, P=propylene), onto which small amounts of maleic anhydride or styrene-maleic anhydride have been grafted, are particularly preferred. Further examples are listed in U.S. Pat. Nos. 4,174,358, 3,845,163, 3,668,274 and 4,174,358.

The preparation of the mixtures of thermoplastic polyamides, phosphinic acid esters of polyphenols, polyfluoroethylene polymers and/or aramides, inorganic reinforcing agents, fillers and pigments, other flameproofing agents and processing auxiliaries can be carried out in the customary mixing units, such as mills, kneaders and single- and multi-screw extruders. The processing auxiliaries can be metered in as concentrates in the thermoplastic polyamide in granulate form or as a powder mixture during compounding of the components. The temperature during the preparation of the mixtures and the production of the shaped articles from them should usually be 260° to 285° C.

The preparation process can be carried out either discontinuously or continuously under conditions under which oxidation is largely excluded, i.e. preferably under an inert gas atmosphere. Suitable inert gases are e.g. nitrogen, carbon dioxide and/or argon.

The polyamide shaped articles which have been given flameproofing treatment are particularly suitable for use in the electrical and car sector and are used, for example, for the production of housings and covers for technical equipment, such as electrical domestic appliances and for car components.

EXAMPLES

A. Components employed

I. Polyamide 66 having a relative viscosity of 3.0, measured on a one percent solution in m-cresol at 25° C., as a granulate;
II. Reaction product (ester) of 4,4'-dihydroxydiphenylmethane and 1-chloro-1-oxo-3-methyl-phospholine (molar ratio 1:2);
III. Methylethylphosphinic acid ester of a novolak of p-cresol and formaldehyde, OH number 468, number of the phenol nuclei about 5;
IV. Reaction product (ester) of novolak according to III. and 1-chloro-1-oxo-phospholine;
V. Reaction product (ester) of novolak according to III. and 1-chloro-1-oxo-3-methylphospholine;
VI. Reaction product (ester) of novolak according to III. and triphenyl phosphate, start of melting 75° C. (Kofler hot bench);
VII. Polytetrafluoroethylene powder, Hostaflon TF 2027 from Hoechst AG;
VIII. Aramide fibre, Kevlar 29 from DuPont de Nemours, USA;
IX. Zinc borate (hydrate), $2ZnO*3B_2O_3*5H_2O$, Firebrake ZB from U.S. Borax & Chemical Corp., USA;
X. Short glass fibre, type CS 7919 from Bayer AG;
XI. Bis-(hexachlorocyclopentadiene)-cyclooctane, Dechlorane Plus 25 from Occidental Chemical Corp., USA;
XII. Melamine cyanurate.

B. Preparation of the phosphinic acid ester additives used (1) Phosphinic acid ester of 1-chloro-1-oxo-3-methylphospholine and bisphenol F (4,4'-dihydroxydiphenylmethane)

200.2 g (1 mol) bisphenol F are heated at 170° to 180° C. under nitrogen in a 1 l flask with a heating bath, stirrer, gas inlet tube for nitrogen, dropping funnel and reflux condenser. 301.1 g (2 mol) 1-chloro-1-oxo-3-methylphospholine are then added dropwise in the course of 2 hours. After 18 hours, the evolution of hydrogen chloride has ended.

After cooling, the still warm ester is taken up in 1 l methylene chloride and the mixture is washed with water until free from chloride. After the methylene chloride solution has been dried, the sodium sulphate is filtered off and the solution is concentrated. The yield is 379.1 g=88.5% of theory. The product is resinous. The phosphorus content is 13.8% (theoretical 14.5%) and the OH number is <10.

(2) Phosphinic acid ester of methylethylphosphinyl chloride and a novolak of p-cresol 239.7 g (2 gram equiv.) of a novolak from p-cresol and formaldehyde (OH number 468, nucleus number about 5) and 5.7 g (0.06 mol) magnesium chloride are heated at 190° to 200° C. under nitrogen in a 2 l flask with a heating bath, stirrer, gas inlet tube for nitrogen, dropping funnel and reflux condenser. 253.1 g (2 mol) methylethylphosphinyl chloride are then added dropwise in the course of 1 hour. The evolution of hydrogen chloride has ended after 72 hours.

After cooling, the still warm ester is taken up in 2 l methylene chloride and the mixture is washed with water until free from chloride. After the methylene chloride solution has been dried, the sodium sulphate is filtered off and the solution is concentrated. The yield is 402.4 g=95.8% of theory. Softening starts at 98° C. on a Kofler hot bench, the phosphorus content is 13.4% (theoretical 14.7%) and the OH number is 0.

(3) Phosphinic acid ester of 1-chloro-1-oxo-phospholine and a novolak of p-cresol 240.3 g (2 gram equiv.) of a novolak of p-cresol and formaldehyde (OH number 469, nucleus number about 5) and 273.1 g (2 mol) 1-chloro-1-oxo-phospholine are reacted as under 2. Working up is likewise carried out as under 2. The yield is 423.2 g=96.1% of theory. Softening starts at 134° C., the phosphorus content is 13.1% (theoretical 14.1%) and the OH number is 0.

(4) Phosphinic acid ester of 1-chloro-1-oxo-3-methyl-phospholine and a novolak of p-cresol 240.3 g (2 gram equiv.) of a novolak of p-cresol and formaldehyde (OH number 468, nucleus number about 5) and 301.1 g (2 mol) 1-chloro-1-oxo-3-methyl-phospholine are reacted as under 2. Working up is likewise carried out as under 2. The yield is 437.1 g=93.3% of theory. Softening starts at 136° C., the phosphorus content is 12.6% (theoretical 13.2) and the OH number is 0.

(5) Phosphoric acid ester of triphenyl phosphate and a novolak of p-cresol 359.6 g (3 gram equiv.) of a novolak of p-cresol and formaldehyde (OH number 468, nucleus number about 5), 652.6 g (2 mol) triphenyl phosphate and 8.6 g magnesium chloride (0.09 mol) are heated at 200° C. for 0.5 hours, after melting, under a vacuum of 300 mbar in a 2 l flask provided with an adjustable mushroom heating hood, capillary tube and short Vigreux column with a descending condenser. The stream of nitrogen passed in via the capillary tube ensures good thorough mixing. 282.3 g (3 mol) phenol are then distilled off over a column and condenser in the course of 1.5 hours under a falling vacuum of 20 to 3 mbar at temperatures of 200° to 210° C. Heating is subsequently completed at 250° C. under a vacuum of 3 mbar for 1 hour.

After cooling, the reaction product is taken up in 2 l methylene chloride and the mixture is washed with water until free from chloride. After the methylene chloride solution has been dried, the sodium sulphate is filtered off and the solution is concentrated. The yield is 694.9 g=95.2% of theory. Softening starts at 75° C. on a Kofler hot bench, the phosphorus content is 8.4% (theoretical 8.5%) and the OH number is 0.

C. Preparation, processing and testing of the moulding compositions

The components employed, in the amounts stated in Table 1 (data in wt.%), are melted in a twin-screw extruder, mixed, extruded to strands and granulated. The moulding compositions can be prepared, for example, using a ZSK 32 extruder from Werner & Pfleiderer at material temperatures of 275° to 285° C., a screw speed of 130 rpm and a through of 8 kg/h.

After adequate drying (e.g. up to 4 hours at 120° C.) the moulding compositions are injection-moulded to shaped articles or standard test bars on the customary injection moulding machines at material temperatures of 260° C., a mould temperature of 80° C. and a melt standing time of not longer than 9 minutes, and subjected to the following tests:
determination of the phosphorus content (elemental analysis, % P),
burning test in accordance with the Underwriter Laboratories specification (UL 94)
Table 2 shows the test data obtained.

enables the amount of phosphinic acid esters according to the invention required for V-0/1.6 mm to be reduced.

We claim:

1. Thermoplastic, flameproofed, non-dripping polyamide moulding compositions based on phosphinic acid esters, containing, per 100 parts by wt. of these polyamide moulding compositions,

TABLE 1

| Composition of the polyamide moulding compositions in wt. % | | | | | | | | | | | |
|---|---|---|---|---|---|---|---|---|---|---|---|
| Components | | | | | | | | | | | |
| I. (polyamide 66) | II. | III. | IV. | V. | VI. | VII. (antidripping agents B) | VIII. | IX: zinc borate | X. (glass fiber D) | XI. | XII. (other FR agents E) |
| | | (phosphorus compounds) | | | | | | | | | |
| comparison examples | | | | | | | | | | | |
| 1 | 71.0 | | | | | | | 1.0 | 8.0 | 20.0 | | |
| 2 | 57,0 | 15.0 | | | | | | | 8.0 | 20.0 | | |
| 3 | 64.0 | 15.0 | | | | | 0.5 | | | 20.0 | | |
| 4 | 64.0 | 15.0 | | | | | | 1.0 | | 20.0 | | |
| examples (according to the invention) | | | | | | | | | | | |
| 1 | 56.0 | 15.0 | | | | | | 1.0 | 8.0 | 20.0 | | |
| 2 | 56.0 | | 15.0 | | | | | 1.0 | 8.0 | 20.0 | | |
| 3 | 56.5 | | | 15.0 | | | 0.5 | | 8.0 | 20.0 | | |
| 4 | 56.0 | | | 15.0 | | | | 1.0 | 8.0 | 20.0 | | |
| 5 | 53.0 | | | | 18.0 | | | 1.0 | 8.0 | 20.0 | | |
| 6. | 53.0 | | | 9.0 | | 9.0 | | 1.0 | 8.0 | 20.0 | | |
| 7 | 55.0 | | | 10.0 | | | | 1.0 | 8.0 | 20. | 6.0 | |
| 8 | 53.0 | | | 7.5 | | 5.0 | | 1.0 | 8.0 | 20. | | 5.0 |

TABLE 2

| | Test data | | |
|---|---|---|---|
| | Wt. % phosphorus | Drip properties | Burning properties UL94/1.6 mm |
| comparison examples | | | |
| 1 | — | drips with burning | n.p. |
| 2 | 2.0 | drips with burning | V-2 |
| 3 | 2.0 | drips with burning | n.p. |
| 4 | 2.0 | drips with burning | n.p. |
| examples (according to the invention) | | | |
| 1 | 2.1 | does not drip | V-1 |
| 2 | 2.0 | does not drip | V-0 |
| 3 | 2.0 | does not drip | V-0 |
| 4 | 2.0 | does not drip | V-0 |
| 5 | 2.3 | does not drip | V-0 |
| 6 | 1.9 | does not drip | V-0 |
| 7 | 1.3 | does not drip | V-0 |
| 8 | 1.4 | does not drip | V-0 |

(n.p. = not passed)

Examples 1 to 8 of Tables 1 and 2 show that the mixture according to the invention of phosphinic acid esters of polyphenols, antidripping agents and zinc borate provide polyamide mixtures thereof with flameproofing to which is attributed the evaluation V-0 according to UL94, non-dripping on test specimens 1.6 mm thick. The simultaneous use of other phosphorus compounds and of halogen and/or nitrogen compounds (A) 3 to 20 wt.% phosphinic acid esters of polyphenols of the formula (I)

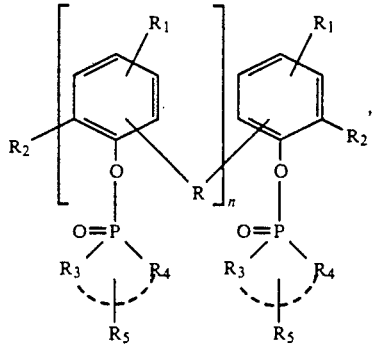

(I)

wherein
n is an integer between 1 and 20,
R is an alkylene group having 1 to 4 carbon atoms, a cycloalkylene group having 5 to 9 carbon atoms or, if n=1, also a direct bond, a sulphonyl or carbonyl group or oxygen or sulphur,
$R_1$ and $R_2$ are hydrogen, halogen, alkyl groups having 1 to 12 carbon atoms, cycloalkyl having 5 to 9 carbon atoms or aryl groups having 6 to 10 carbon atoms and R₃ and R₄ are alkyl groups having 1 to 4 carbon atoms and/or aryl groups having 6 to 10 carbon atoms, it also being possible for R₃ and R₄, in the case of alkyl groups, to be bonded by a single or double bond and for the ring formed via the phosphorus atom to carry alkyl groups R₅ having 1 to 4 carbon atoms, (B) antidripping agents in a total amount of not more than 6 wt.% from the series comprising
(B1) 0.1 to 3 wt.%, of a polyfluoroethylene polymer and/or
(B2) 0.1 to 5 wt.%, of an aramide,
(C) 0.5 to 15 wt.%, zinc borate (hydrates) as a flameproofing reinforcing agent and if appropriate other additives from the series comprising (D) 0 to 40 wt.%, inorganic fillers, reinforcing agents or pigments, (E) 0 to 30 wt.%, other flameproofing agents, (F) 0 to 10 wt.%, processing auxiliaries and (G) 0 to 20 wt.% customary additives for polyamides, selected from the group consisting of UV, light and heat stabilizers, known agents for improving impact strength, agents for improving compatibility and blend polymers.

2. Moulding compositions according to claim 1, characterized in that they contain, as phosphinic acid esters, those of the formulae II and III

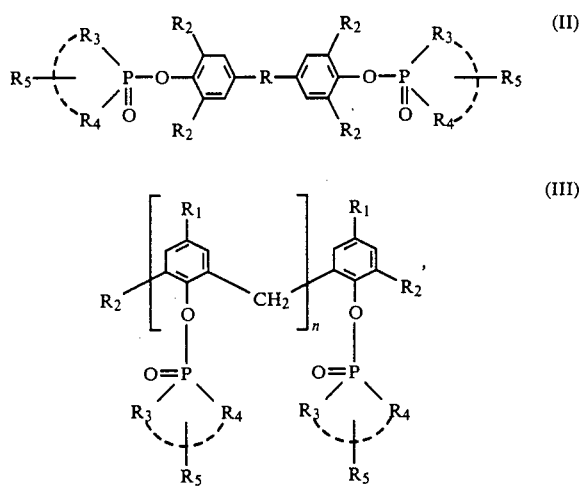

wherein
n represents an integer between 2 and 15,
R represents a single bond, methylene, isopropylidene, oxygen, sulphur or a sulphonyl or carbonyl group,
R₁ represents hydrogen, halogen or an alkyl group having 1 to 12 carbon atoms,
R₂ represents hydrogen, halogen or an alkyl group having 1 to 4 carbon atoms and R₃ and R₄ represent methyl, ethyl or phenyl groups or together represent the butylidene or alkylbutylidene group.

3. Moulding compositions according to claim 1, characterized in that they contain, as the phosphinic acid esters, those of the formula (IV) and (V)

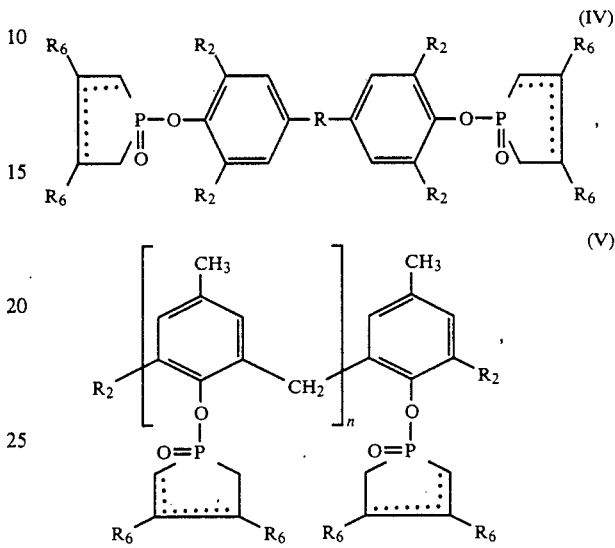

wherein
n is an integer between 2 and 8,
R has the meaning described above,
R₂ represents hydrogen or methyl groups and
R₆ likewise represents hydrogen or methyl groups.

4. Moulding compositions according to claim 1, characterized in that polyamide 6 or polyamide 66 is employed as the polyamide.

5. Moulding compositions according to claim 1, characterized in the component (A) is present in amounts of 5 to 15 wt.%.

6. Moulding compositions according to claim 1, characterized in that component (B) is present in amounts of 0.3 to 2.5 wt.%.

7. Moulding compositions according to claim 1, characterized in that component (C) is present in amounts of 3-12 wt.%.

8. Moulding compositions according to claim 1, characterized in that they additionally contain pigments, inorganic fillers, reinforcing agents, glass fibres, stabilizers, flow agents, mould release agents, antistatics, other flameproofing agents, or as impact modifiers.

9. Moulding compositions according to claim 1, characterized in that phosphoric acid esters of novolaks, melamine compounds and suitable chlorine-containing aliphatic compounds are employed as other flameproofing agents.

10. Process for the preparation of the polyamide moulding compositions of the composition according to claim 1, characterized in that components (A), (B) and (C) and if appropriate (D), (E), (F) and (G), are mixed in a known manner and the mixture is subjected to melt compounding or melt extrusion at temperatures of 200° C. to 330° C.

* * * * *